United States Patent [19]

Timmons et al.

[11] 4,126,024
[45] Nov. 21, 1978

[54] BICYCLE CABLE LOCK

[76] Inventors: David R. Timmons, 501 Avenida Largo, Newport Beach, Calif. 92660; Joseph Romagnoli, 1636 Cypress, La Habra, Calif. 90631; Charles Bryan, 8436 San Clemente Way, Buena Park, Calif. 90620

[21] Appl. No.: 780,859

[22] Filed: Mar. 24, 1977

[51] Int. Cl.² .............................................. B62H 5/14
[52] U.S. Cl. ......................................... 70/233; 70/49; 242/107
[58] Field of Search ............... 70/18, 30, 49, 53, 233, 70/234, 235, 236, 225, 227; 280/289 C; 242/107 R, 107.1

[56] References Cited

U.S. PATENT DOCUMENTS

| | | | |
|---|---|---|---|
| 639,196 | 12/1899 | Fehling | 70/49 |
| 832,366 | 10/1906 | Davis | 242/107 R |
| 2,976,374 | 3/1961 | Polsen | 242/107 R |
| 3,372,887 | 3/1968 | Ladany | 242/107.13 |
| 3,566,332 | 2/1971 | Bonhomme | 242/107.13 X |
| 3,903,719 | 9/1975 | Katz | 70/234 X |
| 3,910,602 | 10/1975 | Lindner | 70/233 X |
| 3,950,972 | 4/1976 | Bleier et al. | 70/234 |
| 3,981,166 | 9/1976 | Madonna | 70/234 |
| 4,037,441 | 7/1977 | Ray | 70/49 X |

*Primary Examiner*—Thomas J. Holko
*Attorney, Agent, or Firm*—George F. Bethel; Patience K. Bethel

[57] ABSTRACT

This disclosure encompasses a cable lock which is particularly suited for securing a bicycle. The lock employs a continuous cable which is wound around a cylinder which is contained in a housing. One end of the cable enters the side wall of the cylinder and exits through an open end. The other end passes out through a hole in the housing. A spring, wound around another portion of the cylinder, maintains a spring load on the cable. Thus, retraction of the cable is possible upon extension and release thereof. The ends of the cable are fashioned into loops which are of a size to maintain it outside of the housing. In the locked condition, the loops are secured by a padlock. A mounting bracket as well as a flange with an opening for storing a padlock is also provided.

8 Claims, 7 Drawing Figures

U.S. Patent  Nov. 21, 1978  4,126,024
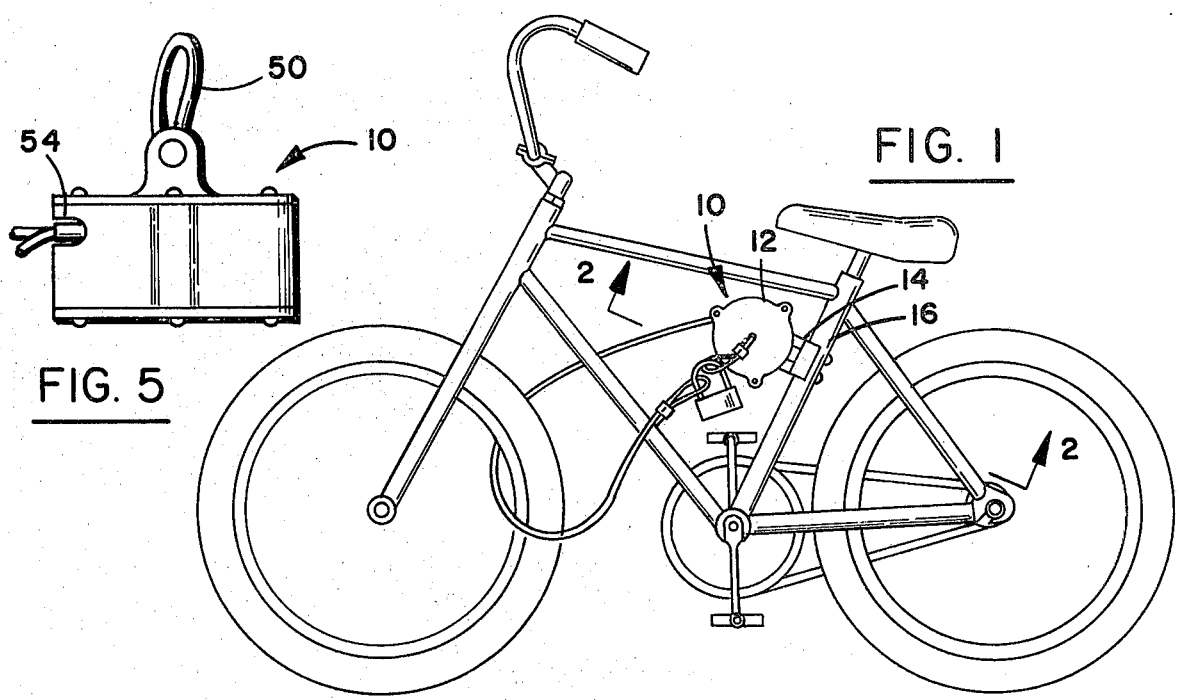
FIG. 1
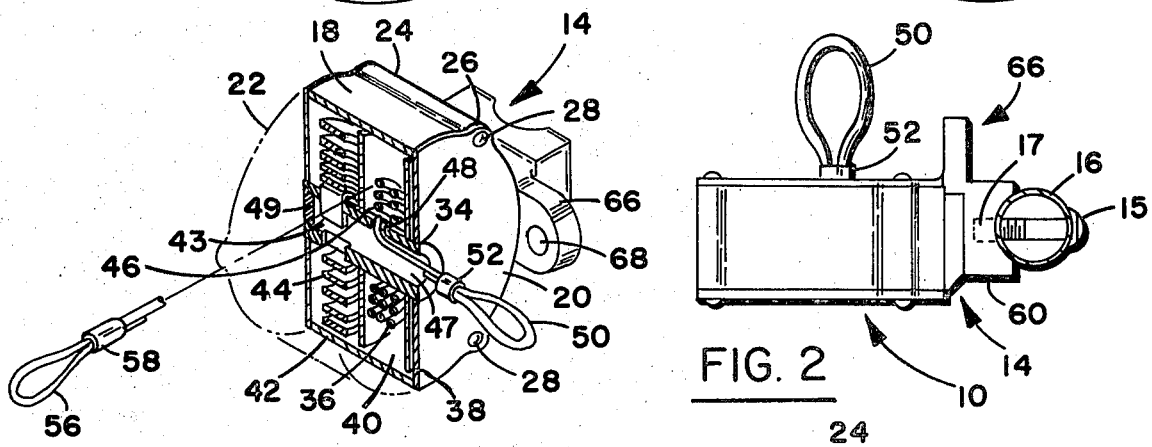
FIG. 5
FIG. 7
FIG. 2
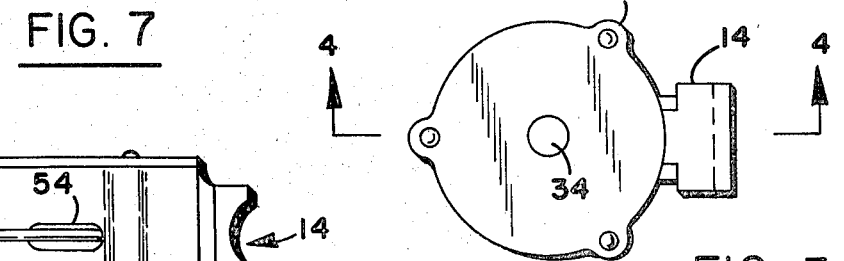
FIG. 6
FIG. 3
FIG. 4

400,000

BICYCLE CABLE LOCK

BACKGROUND OF THE INVENTION

1. Field of the Invention

This invention relates to the field of cable locks and particularly to a lock which is designed for securement of bicycles.

2. Description of the Prior Art

In the past, various types of locks have been utilized for purposes of locking up bicycles. The simplest comprises the use of a chain or plastic encased cable with loops at both ends. The cable is simply wrapped around the bicycle fame and some stationary object such as a lamp pole and the loops secured with a padlock. Such a lock is quite effective, but suffers from the disadvantage of presenting a problem of storage when not in a locked condition. Due to their necessary lengths, such cables require winding around the seat or other portion of the bicycle frame to avoid dragging or entanglement with the wheels.

In an effort to overcome this deficiency, various types of locks have been invented which provide for storage of the lock when in the unlocked position.

In many of these devices, one end of the cable is secure permanently within the housing. The free end is often wound onto a spindle or spool. The free end is wrapped around a stationary object and the bicycle frame, and is then returned and secured to the housing. Frequently, the cable is provided with some means for retraction of the cable when not in use.

For example, the cable lock of U.S. Pat. No. 3,950,972 utilizes a ratchet wheel for rotation of the cable, as well as for the securement of the cable into the housing.

Another example employs a spring loaded cable to provide retraction. The cable is then locked into the housing by means of a series of combination locks as disclosed in U.S. Pat. No. 3,670,535.

A further example utilizes a slotted manually operated rotor to wind up the cable. One end is fixed inside the housing while the opposite end is capable of being extended from the housing. A padlock secures the end of the cable to a portion of its extension as seen in U.S. Pat. No. 3,903,719.

This invention overcomes the foregoing deficiencies by employing a retractable cable that cannot be removed from the housing by virtue of its continuity through the housing and the spindle.

SUMMARY OF THE INVENTION

The present invention utilizes a continuous length of cable having loops at the ends thereof. In particular, the cable is stored inside of a housing, and can be spring loaded to allow for retraction of the cable within the housing after use thereof. One end of the cable enters the side wall of a central cylinder or spindle and exits through an open end. The other end passes out through a hole in the housing.

By utilizing the continuous cable and locking the looped ends with a padlock, a very strong securement is thereby achieved. At the same time, this method of locking is simpler and less subject to failure than those which are resorted to in the prior art.

A bracket is also provided on the lock housing of the present invention for purposes of securing the lock assembly to the frame of the bicycle. The bracket also includes a flanged portion for storage of a padlock.

As a consequence, the cable lock of the present invention is a very strong, simple cable lock, which provides the strength of the prior art devices with the convenience of a storage compartment.

BRIEF DESCRIPTION OF THE DRAWINGS

Further and more specific advantages of the invention are made apparent in the following specification wherein reference is made to the accompanying drawings which illustrate the invention in one or more of its preferred forms.

FIG. 1 is an elevation view of a bicycle with the inventive bicycle cable lock attached thereto;

FIG. 2 is a view of the cable lock taken in the direction of lines 2—2 of FIG. 1;

FIG. 3 is a rear view of the bicycle lock;

FIG. 4 shows a sectional view taken along the lines 4—4 of FIG. 3;

FIGS. 5 and 6 show two plan views of the cable lock of the invention; and,

FIG. 7 shows another sectional view through the cable lock in a perspective relationship.

DETAILED DESCRIPTION OF THE INVENTION

Referring now to FIGS. 1 and 2, it can be seen that the bicycle lock 10 of the invention includes a housing 12 having a mounting bracket 14 attached thereto. The mounting bracket 14 permits attachment of the bicycle lock 10 to any convenient portion of a bicycle frame 16 as shown in FIG. 1. This can be accomplished by non-reversable screws 15 that can pass through the frame 16 into a tapped opening 17 of the bracket 14.

As shown in FIGS. 4 and 7, the housing 12 consists of a substantially rounded flat cylinder 18 having longitudinal ridges 24 therearound. End plates 20 and 22 having lips or tabs 26 overlie the ridges 24 of the housing 12.

The lips or tabs 26 and ridges 24 contain holes 28 and 30 respectively for receiving rivets 32. With the rivets 32 in place, the housing is secure against being opened by ordinary methods. It will be apparent that bolts or one way screws can be used in place of the rivets 32. It is important, however, that any substitution be of a type which is not able to be unscrewed to effect the easy removal of the lock 10.

Within the housing 12 is a centrally located cylinder 34. Along the walls of the cylinder 34 are a pair of parallel based flanges or discs 36 and 38. The presence of the flanges 36 and 38 on the cylinder 34 divide the interior of the housing 12 into two separate compartments 40 and 42.

In compartment 42 is a spring 44, one end of which is attached to the cylinder wall. This is accomplished by passage of a bent end of the spring into a narrow slit 43 in the cylinder wall as shown in FIG. 7. Other means can be used to secure the spring, such as rivets, clamps and the like. The opposite end is secured to the housing wall, by being crimped or bent over a projection 45 shown in FIG. 4. The presence of the spring 44 applies a spring loaded torque or bias to the cylinder 34.

The cylinder 34 with its attached flanges 36 and 38 rotates within the housing 12. As shown in FIGS. 4 and 7, one end 47 of the cylinder 34 is open where it passes through end plate 20. The opposite end 49 of the cylinder 34 where it passes through end plate 22 is closed.

In the other compartment 40 there is a cable 46. One end of the cable 46 passes through a slot 48 in the side of cylinder 34 and out through the open end 47. Here it is formed into a loop 50 which is secured by a metal band 52 which is swaged thereon. The loop 50 is sized larger than the opening 47 so that it is retained outside of the housing 12.

The opposite end of the cable 46 passes through a slot 54 in the side of the housing 12 as detailed in FIGS. 5 and 6. This end of the cable 46 is also fashioned into a loop 56 held by a band 58 similar to that of loop 50. The loop 56 is also made larger than the slot 54 to prevent it from being drawn into the housing by the action of the spring 44.

As previously mentioned, the spring 44 wound around and attached to the cylinder 34 exerts a spring tension on the cylinder 34. In this manner, the cable 46 tightens the spring when it is withdrawn from the housing through slot 54. Upon release of the cable 46, the cable is caused to retract into the housing by the action of the spring 44.

When it is desired to lock or secure the bicycle, the loop 56 is pulled from the housing 12 and around an object to which it is to be locked. It is then secured by a padlock to the other loop 50 which remains stationary.

Since a continuous length of cable is employed which is in effect secured to itself, there is no danger of the cable being separated from the cable lock 10.

The mounting bracket 14 which permits the lock 10 to be secured to the frame 16 of a bicycle, permits the lock to be stored quite conveniently on the bicycle. The bracket 14 as shown in FIGS. 2 and 7, is contoured on one side 60 to conform to the curve of a bicycle frame 16. Within the curved portion 60 are the two tapped holes which accommodate a pair of bolts, rivets, or screws 65, one of which is shown in FIG. 2.

Naturally, it is important that the choice of a screw or rivet or bolt be of such a kind which is not capable of being unscrewed from the bicycle frame to permit the lock to be removed from the bicycle. However, even if this were possible if the cable is threaded through the bicycle wheel and frame and to a stationary object, such as a post, in the manner of FIG. 1, the bicycle would still be secured.

The bracket 14 also contains a lip or ear 66 with an aperture 68. The purpose of this is to provide a storage place for keeping a padlock when the lock is not in use.

It will be apparent from the above description that the cable lock 10 is conveniently attached by means of a bracket 14 to a bicycle. Its compact nature coupled with the capability of the entire cable, save the loops 50 and 56, to be retracted within the housing when not in use provides substantial convenience to a bicycle rider. Although the cable lock 10 is compact, it is possible due to the winding within the housing 10 of the lock, that a considerable length of cable can be stored therein.

A significant feature of this invention is the use of a continuous length of cable which is swaged with the loops at the end. This provides a particularly strong locking assembly with a padlock.

The cable lock as shown constitutes the preferred embodiment of the invention. However, it will be apparent that certain other variations can be resorted to which can be within the scope of the invention For example, while the housing is shown as being substantially round in shape, other geometrical configurations would be within the scope of the invention as long as rotation of the central cylinder is permitted. In the same vein, the flanges 38 and 36 could be reduced to one if desired. As an alternative, in place of the flanges, a plate which is attached to the housing having a central aperture for the cylinder could be substituted therefor. The plate would remain stationery dividing the housing into separate compartments for the spring and the cable. At the same time, the cylinder would be capable of revolving through this plate.

In addition to the foregoing, the type of cable which is used can be varied as to the size and selection of the material of which it is made. As an adjunct thereto, it is preferred to utilize a cable having an outer sheath of plastic which is now common for bicycle locking cables. The purpose of the outer plastic sheath is to prevent any scratching of the bicycle while the cable is being used.

Various other modifications are contemplated which will be apparent to those skilled in the art and may be resorted to without departing from the spirit and scope of the invention as defined by the following appended claims.

We claim:

1. A cable lock comprising:
   a housing having an opening therein;
   a walled cylinder rotatably mounted in said housing having an aperture in a portion of its wall with an opening at least on one end;
   a continuous length of cable adapted for storage in said housing wound around said cylinder, one end of which is threaded through said aperture and out of the open end, the other end passing out through the opening inside the housing so as to provide a continuous loop of cable when the ends are joined together;
   means to secure the ends of said cable outside of said housing which can receive a lock therethrough so that the cable can form a continuous loop when joined by a lock; and,
   a spring secured to said cylinder at one end while the other end is secured to said housing, to maintain a spring tensioned torque on said cylinder and effect retraction of said cable into said housing after extension and release thereof.

2. A cable lock as claimed in claim 1 further comprising:
   means dividing said housing into two compartments formed by a pair of spaced parallel flanges on said cylinder wherein said aperture and said opening are located between said flanges, and said cable occupies a space between said flanges when it is stored.

3. A cable lock as claimed in claim 2 wherein:
   one flange is located near one end of said cylinder and the other is located intermediately along its length.

4. A cable lock as claimed in claim 1 wherein:
   said means to secure the ends of said cable outside of said housing comprise swaged loops at the ends of said cable which are respectively larger than said aperture and said opening in said housing.

5. A cable lock as claimed in claim 1 further comprising:
   a mounting bracket attached to said housing for mounting it on a bicycle frame.

6. A cable lock as claimed in claim 5 wherein:
   said bracket is concave along one side to conform to the tubular frame of a bicycle and contains at least one hole for securement to a bicycle frame with one way non-reversible screws.

7. A cable lock as claimed in claim 5 further comprising:
a flange on said bracket with an aperture therein for purposes of accommodating a padlock.

8. A cable lock as claimed in claim 1 wherein:
said cable is enclosed in a plastic sheath.

* * * * *